April 18, 1939.   J. W. LEIGHTON   2,154,817
HYDRAULIC BRAKE CYLINDER AND METHOD OF MAKING SAME
Filed Feb. 13, 1936   2 Sheets-Sheet 1
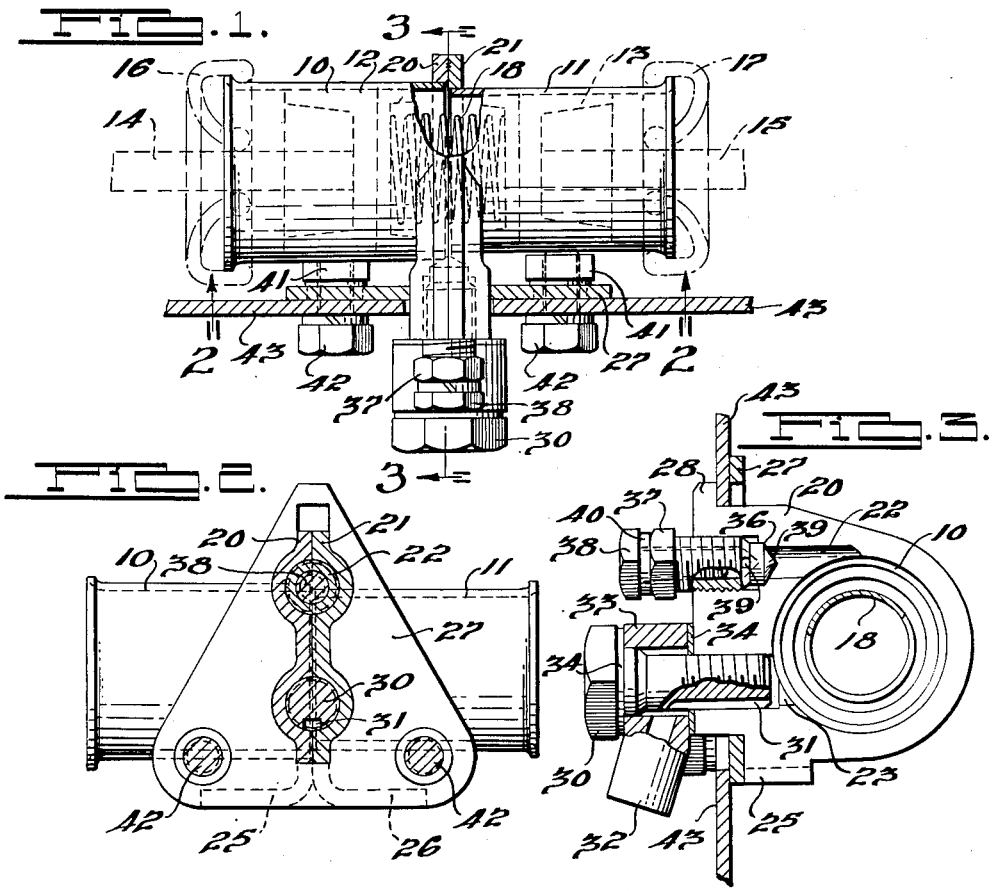
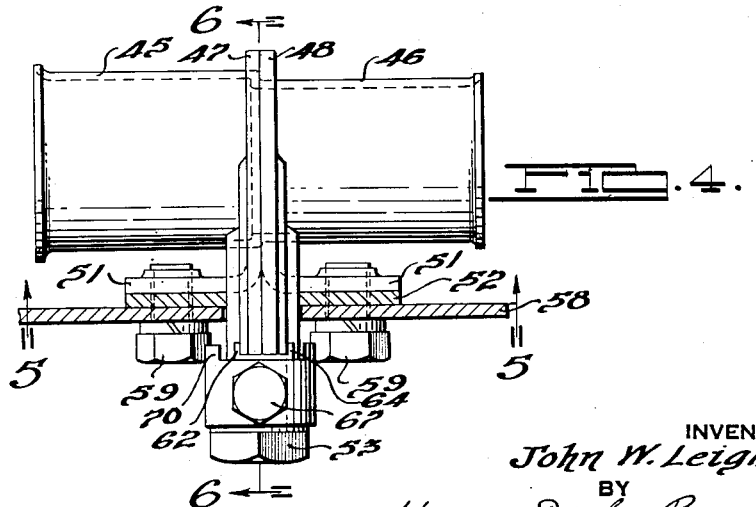
INVENTOR
John W. Leighton
BY
Harness, Dickey, Pierce & Hann.
ATTORNEYS.

April 18, 1939.  J. W. LEIGHTON  2,154,817
HYDRAULIC BRAKE CYLINDER AND METHOD OF MAKING SAME
Filed Feb. 13, 1936  2 Sheets-Sheet 2
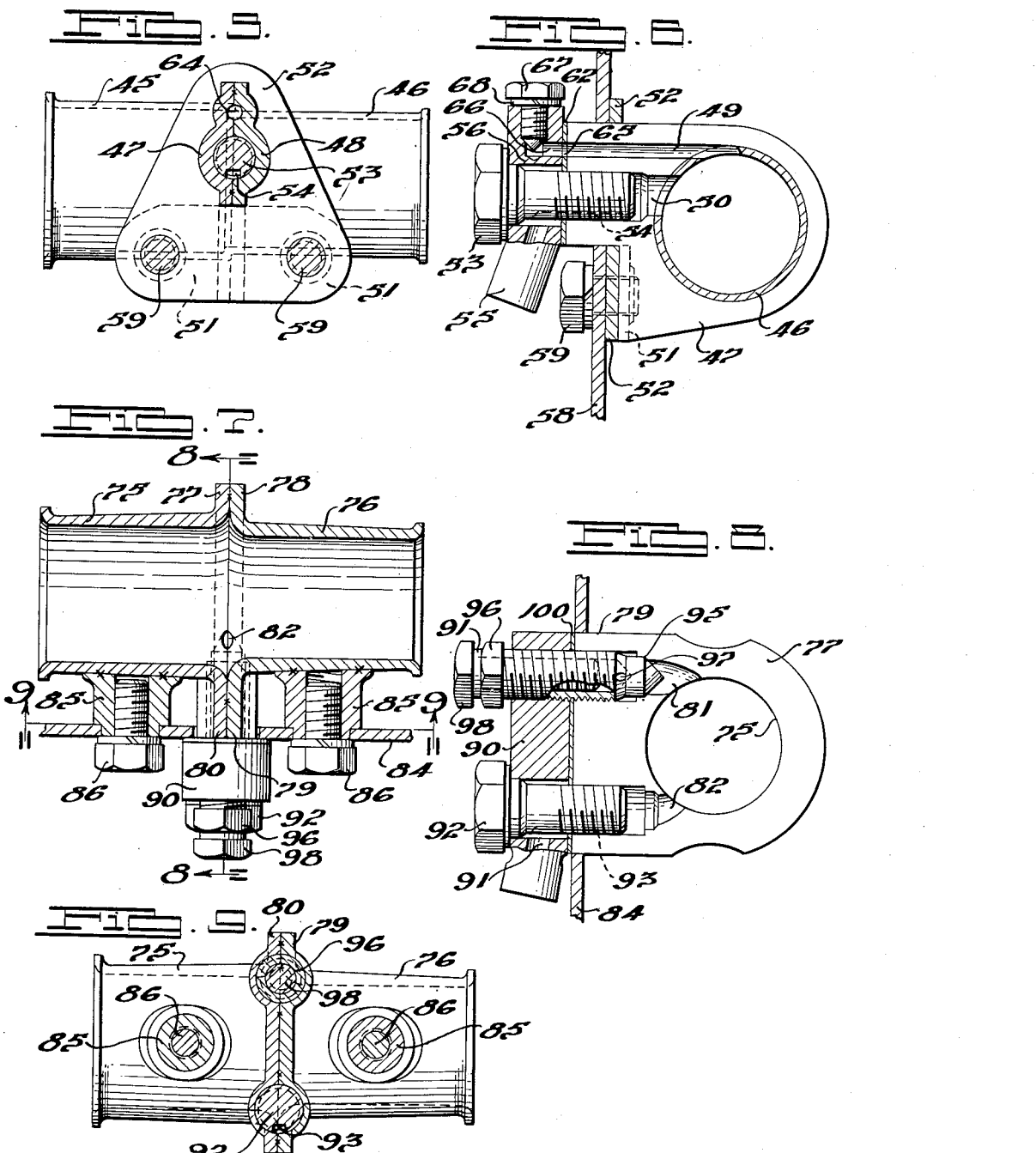
INVENTOR
John W. Leighton
BY
Harness, Dickey Pierce & Hann.
ATTORNEYS.

Patented Apr. 18, 1939

2,154,817

UNITED STATES PATENT OFFICE 2,154,817

HYDRAULIC BRAKE CYLINDER AND METHOD OF MAKING SAME

John W. Leighton, Port Huron, Mich.

Application February 13, 1936, Serial No. 63,727

7 Claims. (Cl. 29—152)

This invention relates to hydraulic brake cylinder assemblies. More particularly it relates to a novel form of hydraulic brake cylinder and mounting therefor including a construction which provides novel, simple and effective means for introducing the fluid to the interior of the brake cylinder and bleeding the same.

The primary object of the present invention is to provide a hydraulic brake cylinder construction which is extremely simple and rugged, and which is exceptionally cheap to manufacture.

Another object of the present invention consists in the provision of a hydraulic brake cylinder construction which is composed substantially entirely of sheet metal parts and which is very easily and conveniently assembled.

A still further object of the present invention consists in the provision of a method of manufacturing hydraulic brake cylinder assemblies which contemplates an exceedingly cheap, effective and simple process of producing the novel brake cylinder construction of the present invention.

Many other and further objects and advantages of the present invention will become clearly apparent from the following specification when considered in connection with the accompanying drawings forming a part thereof.

In the drawings:

Figure 1 is a plan view, with portions broken away, of one embodiment of the improved brake cylinder construction of the present invention, illustrating the same mounted on a conventional brake housing in substantially the position the apparatus is designed to occupy during actual use;

Fig. 2 is a sectional view, taken substantially on the line 2—2 of Fig. 1, illustrating in detail the parts for supporting the brake cylinder construction and showing the ports which provide communication to the interior thereof;

Fig. 3 is a transverse, sectional view, taken substantially on the line 3—3 of Fig. 1, showing in detail the connection of the mounting means to the brake cylinder and the ports which provide communication to the interior thereof;

Fig. 4 is a plan view of a modified form of the invention, showing a construction in which the supporting means for the brake cylinder is of a different and novel construction;

Fig. 5 is a sectional view, taken substantially on the line 5—5 of Fig. 4, illustrating in detail the construction of the modified form of mounting means;

Fig. 6 is a sectional view, taken substantially on the line 6—6 of Fig. 4, illustrating in detail the construction and arrangement of the port which communicates with the interior of the modified cylinder construction;

Fig. 7 is a transverse, sectional view through a still further modified form of the invention, showing a construction in which integral portions of the cylinders provide a structure for forming the ports communicating therewith;

Fig. 8 is a transverse, sectional view, taken substantially on the line 8—8 of Fig. 7, illustrating in detail the construction and arrangement of the ports;

Fig. 9 is a sectional view, taken substantially on the line 9—9 of Fig. 7, illustrating in detail the mounting of the improved brake cylinder construction and the relative positions of the ports communicating therewith.

With more particular reference to the drawings, the specific embodiment of the invention disclosed in Figures 1 to 3 thereof comprises a pair of cylinders 10 and 11 arranged in substantially co-axial relation and adapted to receive pistons 12 and 13, respectively. It has been found preferable in structures of this kind to form the cylinder 10 of slightly larger diameter than the cylinder 11 in order that for a definite predetermined fluid pressure exerted internally of the cylinders, slightly greater force will be imposed upon one end of the brake shoe, which the cylinder serves to actuate than upon the other. This is desirable in order to compensate for the wrapping effect of the brakes on the drums due to the rotation of the wheel and the cylinders are therefore preferably proportioned to provide a resultant braking action which is substantially uniform throughout the entire surface of the brake shoe. The pistons 12 and 13 are provided with piston rods 14 and 15, respectively, which, as is conventional, serve to operate the brake shoe with which the apparatus is associated. As is usual in structures of this type, the pistons 12 and 13 may be maintained in predetermined position within the cylinders by means of annular resilient closures 16 and 17, respectively, and are further positioned resiliently by means of a compression coil spring 18 interposed therebetween. The cylinders are preferably flared at their outer ends in order to provide a surface for effectively seating the closure members 16 and 17.

The cylinders 10 and 11 are preferably supported by means of a pair of bracket members 20 and 21 which have apertures therein adapted to receive respectively the cylinders 10 and 11. These brackets 20 and 21 are formed of sheet metal stampings and are preformed so that when they are arranged face to face, they will together provide a pair of substantially cylindrical ducts 22 and 23, the purpose and function of which are described in detail below. The duct 22 provides means for bleeding the cylinders 10 and 11 and is utilized for the purpose of relieving air from the system during the assembly of the hydraulic brake system at the time the braking fluid is introduced into the system. The duct 23 provides means by which fluid may be introduced into cylinders during operation of the brakes and at all times maintains communication between the conventional master cylinder and the cylinders 10 and 11.

As is best seen by reference to Figures 1 and 2, the cylinders 10 and 11 are mounted in their respective brackets 20 and 21 with their adjacent ends spaced apart slightly in order that the ducts 22 and 23 will communicate directly with the interior of the cylinders. The brackets 20 and 21 are welded to their respective cylinders in order to effect a tight closure with respect thereto and are then welded together face to face, in order to provide a substantially unitary structure.

In order to increase the strength of the supporting structure as a whole, the rackets 20 and 21 are preferably provided with integrally formed wing portions 25 and 26, respectively, which are each bent at right angles to the body of the bracket and, as will hereinafter be more clearly seen, serve to materially strengthen the structure as a whole. A base plate 27, which is shown as being of substantially triangular configuration, is provided with an aperture adapted to receive the mating portion of the brackets 20 and 21 and to slip over these mating portions a sufficient distance to seat on the edges of the wing portions 25 and 26. The brackets 20 and 21 are each preferably provided with substantially identical upwardly extending lugs 28, over which the base plate 27 is adapted to slip in order that once the base plate has been mounted on these members, it will serve to lock them in predetermined position.

The base plate 27 is preferably welded in substantially the position shown, to the adjacent portions of the brackets 20 and 21 to provide therewith a reinforced unitary structure for supporting the cylinders 10 and 11.

In the assembly of the structure described above, I have found it particularly desirable to insert the cylinders 10 and 11 into the apertures in their respective brackets, then to place the brackets face to face and lock them in fixed position by slipping the base plate thereover. When the parts have thus been arranged in assembled position, I have found it particularly desirable to place welding material, such for example as copper wire, adjacent the joints in the structure, and then subject the structure as a whole to a welding temperature in an inert atmosphere, during which time the copper wire adjacent the joints melts and flows into the cracks between the parts, effectively welding them together to provide a unitary structure and at the same time effectively sealing the cracks between the adjacent abutting parts of the structure as a whole.

After the above described parts have been welded together to provide a unitary structure, the ducts 22 and 23 are internally threaded to receive the fittings hereinafter described in detail.

A bolt 30 is provided which is adapted to be received within the feed duct 23. This bolt 30 has an axially extending channel or groove 31 cut therein which permits the passage of fluid through the duct 23 when the bolt 30 is screwed in position in this duct. The bolt 30 serves to position and mount a fluid supply fitting 32, which has an annular portion 33 surrounding the shank of the bolt 30 and is preferably locked in position upon the bracket 28 by screwing the bolt 30 into the internally threaded duct 23. In order to effect a tight seal between the fitting 32, the bracket and bolt, washers 34 of suitable construction may be interposed therebetween.

From the above described construction, it will be apparent that fluid may be introduced through the fitting 32 into the annular space surrounding the shank portion of the bolt 30. This fluid may pass freely along the axially extending groove 31 into the duct 23 adjacent the cylinders 10 and 11.

As has been pointed out above, the adjacent ends of the cylinders are spaced apart slightly from one another and it will be consequently apparent that liquid may flow freely from the duct 23 into the interior of the cylinders 10 and 11 through this space.

The bleed duct 22 preferably has a valve seat 36 of conical form ground therein and outwardly of the valve seat a threaded bushing 37 is screwed into the threaded portion of the duct. This threaded bushing is preferably formed conical at its inner end 39 to cooperate with the valve seat 36 to normally effect a tight closure of the bleed duct 22. The hollow bushing 37 is internally threaded and adapted to receive a closure plug 38, which may be screwed therein, and held in position by means of a conventional lock washer 40.

From the foregoing, it will be seen that when the brake system is being assembled and filled with fluid the closure plug 38 may be removed and a suitable conduit threaded into the bushing interiorly thereof. After connection of the conduit, the bushing may be unscrewed slightly, thus raising the conical end 39 from the valve seat 36 and permitting the fluid from the interior of the cylinder to flow outwardly through the duct 22, through the valve 36, into the interior of the bushing 37, through suitable apertures in the bushing 39.

The above described structure makes possible the closing of the duct while the conduit is still connected to the bushing. After the fluid has been introduced into the cylinders 10 and 11, and the air bled therefrom by means of the duct 22 and associated structure, the closure plug 32 may be screwed into position in the bushing and the conduit may be removed.

In order to mount the above described assembly upon the brake housing structure with which it is adapted to be used, a pair of cylindrical internally threaded bosses 41 may be welded to the base plate 27. Suitable internally threaded bores extend through the base plate and through these bosses, which are adapted to receive bolts 42, serving to firmly secure the structure as a whole to a brake housing structure 43 on which it is mounted.

In the form of the invention illustrated in Figures 4 to 6, inclusive, a modified form of the invention is shown. This construction comprises a brake cylinder formed of a single integral piece of sheet metal preformed to provide cylindrical portions 45 and 46 disposed in co-axial relation, with respect to each other, the cylinder 45 being of slightly larger diameter than the cylinder 46.

This cylinder is mounted on a pair of mating bracket members 47 and 48, respectively, which bracket members have their adjacent surfaces preformed so that the two brackets will together provide a pair of ducts 49 and 50, which serve to communicate with the interior of the cylinder. The edge portions of the brackets 47 and 48 are bent to provide out-turned wings 51 which lie substantially in the same plane and serve to provide a seat for a base plate 52, which is slipped over the body portion of the brackets substantially in the manner described in connection with the form of the invention shown in Figures 1 to 3. It will be noted that due to the fact that the cylinder construction shown in this form of the invention is of the one piece type, it is necessary to cut away the wall thereof adjacent the ends of the ducts 49 and 50 to permit communication between the ducts and the interior of the cylinder.

As was the case in the form of the invention described above, the fluid supply duct 50 is internally threaded to receive a bolt 53, which has an axially extending groove or channel 54 therein to permit the passage of fluid through the duct 50 when the bolt is screwed therein. The bolt 53 serves to retain a fluid supply fitting 55 which has an annular portion 56 adapted to surround the shank of the bolt and provides communication with the axially extending groove 54 and duct 50 to the interior of the cylinder.

The brake cylinder assembly as a whole is mounted upon the brake housing 58 with which it is associated by means of a pair of bolts 59 passing through suitable apertures in the housing 58 and threaded into suitable threaded bores formed in the backing plate 53 and the wing portions 51 which are secured thereto. A sealing washer 62 is preferably interposed between the fluid supply fitting 55 and the mating brackets 47 and 48 to which this fitting is secured. This washer may be formed of copper or other suitable similar material and is preferably provided with a pair of depending ears 64 which prevent relative rotation of the washer with respect to the brackets on which it is mounted.

The washer is provided with an aperture 65 adapted to register wtih the bleed duct 49 and it will be apparent by reference to Figure 6 that the fluid supply fitting 55 has formed therein a bleed port 66 which is normally adapted to be closed by a screw plug 67 locked therein by means of a lock washer 68.

From the foregoing, it will be clear that the fluid supply fitting 55, as a whole, is rotatable about the bolt 53 which serves to secure it to the mating brackets 47 and 48. In order to limit the amount of this rotational movement, the fluid supply fitting is provided with a pair of depending lugs or ears 70, clearly seen in Fig. 4, which will abut against the side of the brackets 47 and 48 and limit rotational movement of the fluid supply fitting with respect to the brackets within a relatively short arc.

It will be clear, however, that the extent of this arcuate movement is sufficient to bring the bleed port 66 into, or out of registry with the bleed duct 49, and it will be seen that when the fluid supply fitting is moved to a position where the port 66 and the duct 49 are out of registry, the face of the fluid supply fitting will serve to provide an effective seal for the bleed duct 49.

At the time the fluid is introduced into the system by means of the fluid supply fitting 55, it will be seen that this fluid will flow in through the fitting 55 into the annular space surrounding the shank of the bolt 50. From this annular space, it will be permitted to flow along the axially extending groove 54 into the fluid supply duct 50 and consequently, into the interior of the cylinder. A suitable conduit may be connected to the bleed port 66 in place of the closure plug 67 and it will be apparent that air may be bled off from the cylinder through the duct 49, aperture 65 in the washer, and bleed port 66, out through the conduit. After all air has been removed from the system, the fluid supply fitting 65 may be swung around arcuately to effectively seal the bleed duct 49 and the conduit may be disconnected and screw plug 67 inserted in order to protect the bleed port from accumulation of foreign matter. The bolt 53 may then be tightened up to effectively and tightly seal the system.

In the form of the invention illustrated in Figures 7, 8 and 9, a still further modified type of hydraulic brake cylinder assembly is shown embodying some of the features shown in the forms of the invention described above.

In this form of the invention, it will be seen by reference to Figures 7 and 9 that the co-axially disposed cylinders are formed from a pair of mating sheet metal stampings. These stampings are preferably extruded to form cylinders 75 and 76 of slightly different diameters and having mating flanges 77 and 78, respectively. These flanges are preferably extended substantially on one side of the cylinder to form a pair of radially extending mating brackets 79 and 80, which, at the time the stampings are formed, are provided, in their mating surfaces, with semi-cylindrical grooves 81 and 82, which, together, form substantially cylindrical ports communicating with the interior of the cylinders 75 and 76. These two stampings preferably have their adjacent faces ground and secured together by the process of copper welding described in detail above.

In order to secure the cylinder assembly to a brake housing structure, the brake housing structure is provided with an aperture adapted to receive the mating radially extending flanges 79 and 80. Screw bosses 85 may be welded to the cylindrical surfaces of the cylinders 75 and 76, these bosses being internally threaded and adapted to receive bolts 86 passing through suitable apertures in the wall of the brake housing 84. A fluid supply fitting 90 is provided, having a pair of apertures therein adapted to register with the outer ends of the ducts 81 and 82. This fluid supply fitting is provided wtih a duct 91, which communicates with one of these apertures. A securing bolt 92 is threaded into the cylindrical duct 82, and, as was the case in the bolts above described, is provided with an axially extending channel 93, which serves to permit communication between the duct 82 and the feed duct 91. The bleed duct 81 is formed to provide a conical valve seat 95, which is adapted to be closed by a hollow externally threaded bushing 96 and screwed into the fluid supply fitting 90 and into the cylindrical bore of the duct 81. This bushing 96 is provided with a conical portion adapted to engage the valve seat 95. Outwardly of this conical valve seat, the bushing is provided with suitable apertures 97, which provide communication with the interior of the bushing. The interior of the bushing is normally closed by means of a screw plug 98 threaded into the bushing and locked in position by means of a suitable lock washer 99. As was the case in the form of the invention described above, the fluid supply fitting 90 may be sealed on to the adjacent portion of the cylinder assembly by means of a gasket 100.

It will be apparent that the structure described in connection with this form of the invention may be assembled and bled in substantially the same manner as the structure described in the modification shown in Figures 1 to 3, inclusive, of the drawings.

It will be appreciated that the above described forms of the invention are merely illustrative of the generic concept presented. Many other and further modifications, falling within the scope of the invention as defined in the subjoined claims, will be apparent to those skilled in the art.

What is claimed is:

1. Apparatus of the class described comprising a pair of cylinders having their adjacent ends arranged in spaced relation, sheet metal brackets for supporting said cylinders secured thereto and to each other, said brackets preformed to provide a port therebetween communicating with the interior of said cylinders.

2. In a brake cylinder assembly, a pair of cylinders having their adjacent ends arranged in spaced relation, sheet metal brackets for supporting said cylinders secured thereto and to each other, said brackets being preformed to provide a port therebetween communicating with the interior of said cylinders, and means for connecting a fluid supply duct to said port.

3. In a brake cylinder assembly, a pair of cylinders having their ends arranged in spaced relation, a pair of sheet metal brackets surrounding one of said cylinders and secured thereto, said brackets being secured together face to face, and a base plate surrounding said brackets and secured thereto to provide a unitary construction.

4. In a brake cylinder assembly, a pair of cylinders having their adjacent ends arranged in spaced relation, a pair of sheet metal brackets each engaging one of said cylinders and arranged face to face, and a base plate engaging and surrounding said brackets, all of said parts being welded together to provide a substantially unitary structure.

5. In a brake cylinder assembly, a pair of cylinders, a pair of sheet metal members serving to support said cylinders to provide ports communicating with the interior thereof, one of said ports being internally threaded, a fluid supply fitting associated with one of said ports, and means engaging the threaded interior of said port for maintaining said fluid supply fitting in communication with said port.

6. The method of forming a hydraulic brake cylinder assembly, which includes forming a pair of brackets having mating grooves therein which together form ducts therebetween, inserting cylinders in said brackets, surrounding said brackets with a base plate to lock the same in predetermined relative position and simultaneously welding said members together to provide a unitary structure.

7. The method of forming a hydraulic brake cylinder assembly, which includes forming a pair of brackets having mating grooves therein which together form ducts therebetween, inserting cylinders in said brackets, surrounding said brackets with a base plate to lock the same in predetermined relative position, simultaneously welding said members together to provide a unitary structure and internally threading said ducts.

JOHN W. LEIGHTON.